(12) United States Patent
Yamada et al.

(10) Patent No.: US 8,196,888 B2
(45) Date of Patent: Jun. 12, 2012

(54) SEAT SLIDE DEVICE FOR VEHICLE

(75) Inventors: Yukifumi Yamada, Toyota (JP);
Hiroyuki Okazaki, Chiryu (JP); Naoki Goto, Tokai (JP)

(73) Assignee: Aisin Seiki Kabushiki Kaisha, Kariya-Shi, Aichi-Ken (JP)

( * ) Notice: Subject to any disclaimer, the term of this patent is extended or adjusted under 35 U.S.C. 154(b) by 165 days.

(21) Appl. No.: 12/676,975

(22) PCT Filed: Dec. 10, 2008

(86) PCT No.: PCT/JP2008/072439
§ 371 (c)(1),
(2), (4) Date: Mar. 8, 2010

(87) PCT Pub. No.: WO2009/084393
PCT Pub. Date: Jul. 9, 2009

(65) Prior Publication Data
US 2010/0327138 A1    Dec. 30, 2010

(30) Foreign Application Priority Data

Dec. 27, 2007    (JP) .................................. 2007-336231

(51) Int. Cl.
*F16M 13/00*    (2006.01)
(52) U.S. Cl. ......... 248/429; 248/424; 248/423; 297/346
(58) Field of Classification Search .................. 248/430, 248/429, 424
See application file for complete search history.

(56) References Cited

U.S. PATENT DOCUMENTS

| | | | | |
|---|---|---|---|---|
| 3,930,632 A | * | 1/1976 | Shigeta et al. | 248/429 |
| 4,478,383 A | * | 10/1984 | Urai | 248/429 |
| 4,606,588 A | * | 8/1986 | Koch | 384/18 |
| 4,629,254 A | * | 12/1986 | Stolper et al. | 297/473 |

(Continued)

FOREIGN PATENT DOCUMENTS

GB    2 014 444 A    8/1979
(Continued)

OTHER PUBLICATIONS

International Search Report issued by the Japanese Patent Office on Feb. 10, 2009 as the International Searching Authority in International Application No. PCT/JP2008/072439.

(Continued)

*Primary Examiner* — Amy J Sterling
(74) *Attorney, Agent, or Firm* — Buchanan Ingersoll & Rooney PC (57) ABSTRACT

In a vehicle set slide device, a lower rail has a base portion extending in face-to-face relation with a vehicle floor, two first inside portions extending in close contact upward from a center part of the base portion, and lower hook portions extending outward from upper ends of both of the first inside portions each to take an inverted U-letter shape. An upper rail has vertical wall portions extending downward from both ends of a horizontal wall portion. Further, the upper rail is provided therein with a hook member which has joining portions joined with both of the vertical wall portions and extending downward and upper hook portions extending inward from lower ends of the joining portions each to take a U-letter shape. When a separation load against the lower rail is exerted on the upper rail, the lower hook portions and the upper hook portions are brought into engagements.

11 Claims, 8 Drawing Sheets

U.S. PATENT DOCUMENTS

| | | | | |
|---|---|---|---|---|
| 4,779,999 | A | * | 10/1988 | Lautenschlager ............... 384/18 |
| 4,901,421 | A | * | 2/1990 | Takarabe et al. ................ 29/437 |
| 5,167,393 | A | * | 12/1992 | Hayakawa et al. ........... 248/430 |
| 5,213,300 | A | * | 5/1993 | Rees ............................. 248/429 |

FOREIGN PATENT DOCUMENTS

| | | |
|---|---|---|
| JP | 53-145219 A | 12/1978 |
| JP | 54-122525 A | 9/1979 |
| JP | 63-180340 U | 11/1988 |
| JP | 64-42933 U | 3/1989 |
| JP | 2002-059770 A | 2/2002 |
| JP | 2002-087207 A | 3/2002 |
| JP | 2002-154354 A | 5/2002 |
| JP | 2004-210258 A | 7/2004 |

OTHER PUBLICATIONS

Extended European Search Report issued on Dec. 27, 2011 by the European Patent Office in European Application No. 08867325.6.

* cited by examiner

SEAT SLIDE DEVICE FOR VEHICLE

TECHNOLOGICAL FIELD

The present invention relates to a vehicle seat slide device provided with a lower rail fixed to a vehicle floor, an upper rail supported movably relative to the lower rail and a hook mechanism for absorbing a separation load acting on the upper rail against the lower rail.

BACKGROUND ART

Figure 7:
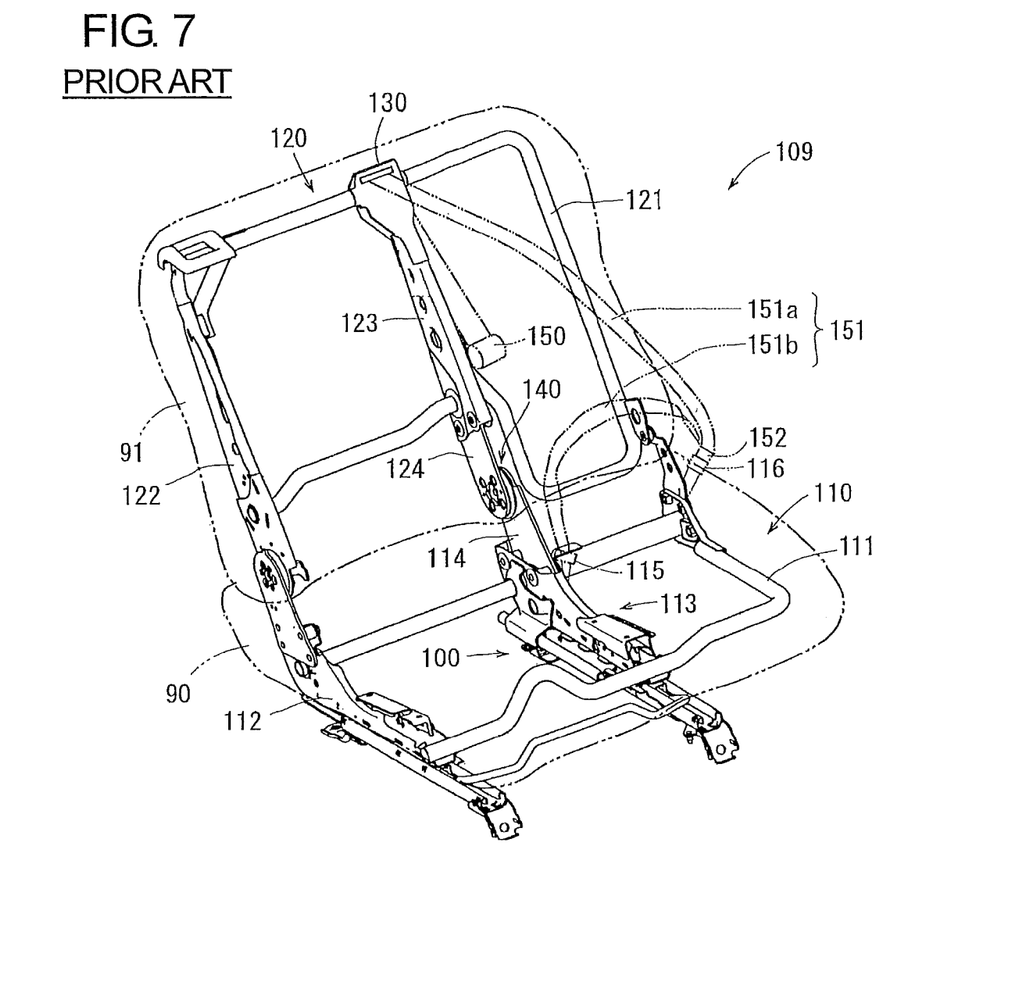
[FIG. 7] is a perspective view of a vehicle seat device incorporating a vehicle seat slide device in the prior art.

Heretofore, as shown in FIG. 7, there has been known a vehicle seat device using a vehicle seat slide device 100. In the vehicle seat device, a vehicle seat frame 109 is assembled to the vehicle seat slide device 100. The vehicle seat frame 109 is provided with a seat cushion frame 110 supporting a seat cushion 90, a seatback frame 120 supporting a seatback 91, a recliner 140 which pivotably joins the seatback 91 with the seat cushion 90 for adjusting the angle of pivot movement, and a shoulder belt anchor 130 provided on an upper end of the seatback frame 120. Back side frames 121, 122 are arranged on both sides of the seatback frame 120, and a back center frame 123 taking the form of a hollow, square pillar is arranged at a center part of the seatback frame 120. Further, cushion side frames 111, 112 are arranged on the both sides of the seat cushion frame 110, and a cushion center frame 113 is arranged on a center part of the seat cushion frame 110. An upper arm 124 made of a thick plate is fastened by means of bolts to a lower port of the back center frame 123, and a lower arm 114 made of a thick plate is fastened by means of bolts to an upper part of the cushion center frame 113. Then, between the upper arm 124 and the lower arm 114, the recliner 140 is provided to pivotably join the upper arm 124 and the lower arm 114.

Further, a retractor 150 is attached to the seatback frame 120, and a seat belt 151 comprising a shoulder belt portion 151a and a lap belt portion 151b is arranged to have its one end wound up by the retractor 150. The other end of the seat belt 151 is secured to an anchor plate 115 attached to the cushion center frame 113, and the intermediate portion of the seat belt 151 passes through a tongue plate 152. The tongue plate 152 is able to be attached to, and detached from, a buckle 116 attached to the cushion side frame 111. The vehicle seat frame 109 is for two passengers, and description is omitted regarding a seat belt for a seat on one side.

Figure 8:
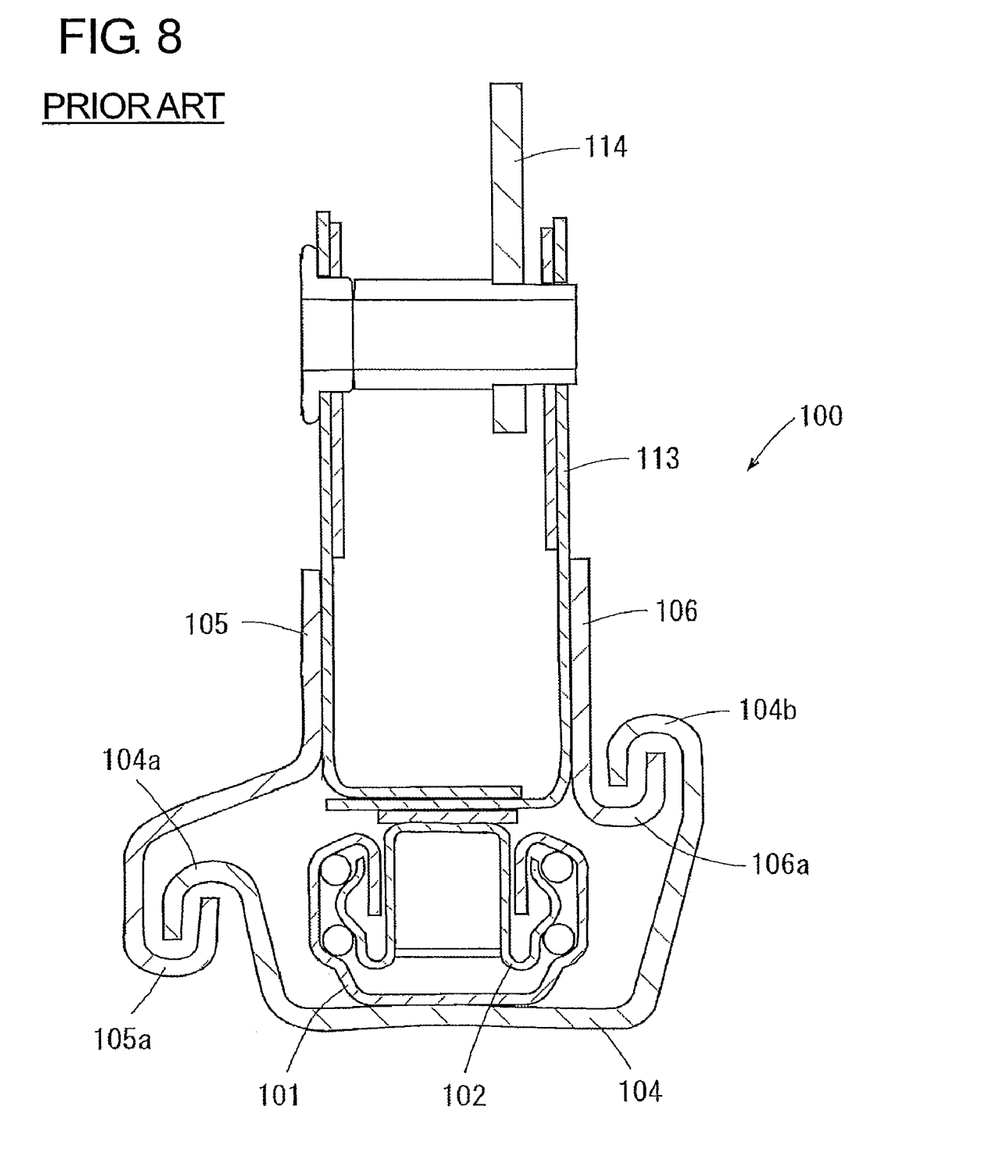
[FIG. 8] is a sectional view of the vehicle seat slide device in the prior art.

As shown in FIG. 8, the vehicle seat slide device 100 is provided with a lower rail 101 fixed to a vehicle floor and an upper rail 102 supported movably relative to the lower rail 101. A horizontal upper portion of the upper rail 102 is joined with a horizontal lower portion of the cushion center frame 113 through a joining portion (e.g., a vehicle seat slide device described in Patent Document 1). Further, lower hook portions 104a, 104b each taking an inverted U-letter shape are formed at both ends of a lower hook member 104 secured to the lower rail 101, whereas upper hook portions 105a, 106a each taking a U-letter shape are formed at lower ends of upper hook members 105, 106 secured to the cushion center frame 113. The lower hook portions 104a, 104b and the upper hook portions 105a, 106a constitute a hook mechanism which absorbs a separation load acting on the upper rail 102 against the lower rail 101 (e.g., a vehicle seat slide device described in Patent Document 2).

In the vehicle seat device using the vehicle seat slide device 100, a moment acts to lift up the rear end of the cushion center frame 113 at the time of a vehicle collision (particularly, at the time of a frontal collision). As a result, a separation load against the lower rail 101 is exerted on the upper rail 102 through the joining portion between the cushion center frame 113 and the upper rail 102. Particularly, where the seat belt 151 is brought into lock, a large moment is exerted on the cushion center frame 113 through the shoulder belt anchor 130, the back center frame 123 and the like, whereby a heavy separation load against the lower rail 101 is exerted on the upper rail 102. However, it is deemed that even in such a case, the separation of the upper rail 102 from the lower rail 101 can be prevented in the vehicle seat slide device 100 because the lower hook portions 104a, 104b and the upper hook portions 105a, 106a are brought into engagements.

Patent Document 1: JP 2002-59770 A
Patent Document 2: JP 2002-87207 A

DISCLOSURE OF THE INVENTION

Problem to be Solved by the Invention

However, in the vehicle seat slide device 100 in the aforementioned prior art, because the upper rail 102 and the cushion center frame 113 are joined at the horizontal joining portion, the load is transmitted from the vertical direction to the horizontal direction at the time of a vehicle collision (particularly, at the time of a frontal collision), and the joining portion is imposed of a bending moment which depends on the distance from vertical walls of the cushion center frame 113. As a result, the cushion center frame 113 is liable to be deformed be separated from the upper rail 102. Further, the vehicle seat slide device 100 becomes large in dimension because the lower hook member 104 and the upper hook members 105, 106 protrude outside of the lower rail 101. Further, in the vehicle seat slide device 100, when the lower hook portions 104a, 104b and the upper hook portions 105a, 105b are brought into engagements at the time of a vehicle collision (particularly, at the time of a frontal collision), a bending moment acts on the engaging portions. Thus, in order to prevent the separation of the upper rail 102 from the lower rail 101, the lower hook portions 104a, 104b and the upper hook portions 105a, 106b have to be sufficiently thick, thereby increasing the weight.

The present invention has been made taking such problems in the prior art into consideration and provides a vehicle seat slide device which is downsized and light weight with the strength secured.

Measures for Solving the Problems

To solve the foregoing problems, the feature of a vehicle seat slide device according to the invention in a first aspect resides in comprising a lower rail adapted to be fixed to a vehicle floor and having a base portion extending in face-to-face relation with the floor, two first inside portions extending in close contact upward from a center part of the base portion, and lower hook portions extending outward from upper ends of both of the first inside portions each to take an inverted U-letter shape; an upper rail supported movably relative to the lower rail and having a horizontal wall portion parallel to the base portion and vertical wall portions extending downward from both ends of the horizontal wall portion; and a hook member having joining portions provided in the upper rail to be joined with both of the vertical wall portions and to extend downward and upper hook portions provided in the upper rail to extend inward from lower ends of the joining portions and each to take a U-letter shape; wherein when a separation load against the lower rail is exerted on the upper rail, the lower hook portions and the upper hook portions are brought into engagements to absorb the separation load acting on the upper rail against the lower rail.

The feature of the vehicle seat slide device according to the invention in a second aspect resides in that in the first aspect, a horizontal portion connecting upper ends of the both joining portions of the hook member is in contact with a lower surface of the horizontal wall portion of the upper rail; an opening portion opening rearward is formed at a rear part of the horizontal wall portion of the upper rail; the hook member is provided with a fastened portion to be fastened to a seatback frame; and the fastened portion of the hook member extends outside from the opening portion of the horizontal wall portion.

The feature of the vehicle seat slide device according to the invention in a third aspect resides in that in the first or second aspect, the upper rail and the hook member constitute a seat cushion frame.

The feature of the vehicle seat slide device according to the invention in a fourth aspect resides in that in any one of the first to third aspects, the lower hook portions of the lower rail are provided with pluralities of lock claws of a comb-tooth shape in a longitudinal direction and that a lock lever with lock holes formed thereon to be disengageably engageable with the lock claws is vertically movably provided in the upper rail.

The feature of the vehicle seat slide device according to the invention in a fifth aspect resides in that in the fourth aspect, the upper hook portions of the hook member are provided with pluralities of bottom holes and that when the upper rail with a separation load exerted thereon is deformed relative to the lower rail, the lock claws are brought into engagements with the bottom holes.

Effects of the Invention

In the vehicle seat slide device according to the invention in the first aspect, the lower rail has the base portion extending in face-to-face relation with the vehicle floor, the two first inside portions extending in close contact upward from the center part of the base portion, and the lower hook portions extending outward from the upper ends of both of the first inside portions each to take an inverted U-letter shape, whereas the upper rail has the horizontal wall portion parallel to the base portion and the vertical wall portions extending downward from both ends of the horizontal wall portion. Further, the upper rail is provided therein with the hook member which has the joining portions joined with the both vertical walls and extending downward and the upper hook portions extending inward from the lower ends of the joining portions each to take a U-letter shape. Then, when a separation load against the lower rail is exerted on the upper rail, the lower hook portions and the upper hook portions are brought into engagements. Therefore, when a separation load against the lower rail is exerted on the upper rail at the time of a vehicle collision (particularly, at the time of a frontal collision), the load applied to the upper rail in a vertical direction is transmitted to the hook member in the vertical direction and is efficiently transmitted as it is to the upper hook portions and the lower hook portions, so that it is possible to prevent the separation of the upper rail and to secure the strength. Further, since the upper hook portions and the lower hook portions are housed in the lower rail and the upper rail, it can be avoided to become large in dimension. Further, since the bending moment acting on the engaging portions between the upper hook portions and the lower hook portions is not so great, it is not required to extremely thicken the upper hook portions and the lower hook portions. Therefore, the vehicle seat slide device can be downsized and light weight with the strength secured.

In the vehicle seat slide device according to the invention in the second aspect, the horizontal portion connecting the upper ends of the both joining portions of the hook member is in contact with the lower surface of the horizontal wall portion of the upper rail, the opening portion opening rearward is formed at the rear part of the horizontal wall portion of the upper rail, and the hook member is provided with the fastened portion to be fastened to the seatback frame. Herein, the seatback frame is a member to support a seatback. Then, the fastened portion of the hook member extends outside from the opening portion of the horizontal wall portion, and thus, when an upward load is applied to the seatback frame at the time of a vehicle collision (particularly, at the time of a frontal collision), a deformation takes place to make the lower surface of the horizontal wall portion of the upper rail and the horizontal portion of the hook member contact close, so that the hook member and the upper rail can be prevented from being separated with the strength increased further.

In the vehicle seat slide device according to the invention in the third aspect, since the upper rail and the hook member constitute the seat cushion frame, the number of parts can be reduced. Herein, the seat cushion frame is a member to support a seat cushion.

In the vehicle seat slide device according to the invention in the fourth aspect, since the lower hook portions of the lower rail are provided with the pluralities of lock claws of the comb-tooth shape in the longitudinal direction whereas the lock lever with the lock holes formed thereon to be disengageably engageable with the lock claws is vertically movably provided in the upper rail, it is possible to lock or move the upper rail relative to the lower rail.

In the vehicle seat slide device according to the invention in the fifth aspect, since the upper hook portions of the hook member are provided with the pluralities of bottom holes and since when the upper rail with a separation load exerted thereon is deformed relative to the lower rail, the lock claws are brought into engagements with the bottom holes, it is possible to decrease the deformation of the upper rail relative to the lower rail.

DESCRIPTION OF REFERENCE SYMBOLS

10 . . . lower rail, 11 . . . base portion, 12 . . . first inside portion, 13a . . . lock claw, 20 . . . upper rail, 21 . . . horizontal wall portion, 22 . . . vertical wall portion, 26 . . . opening portion, 30 ... hook member, 32 ... joining portion, 34 ... bottom hole, 35 ... fastened portion, 13, 33 ... hook mechanism (13 ... lower hook portion, 33 ... upper hook portion), 40 ... lock lever, 41 ... lock hole, 3 ... seat cushion frame, 80 ... seatback frame.

PEEFERRED EMBODIMENT FOR PRACTICING THE INVENTION

Figure 1:
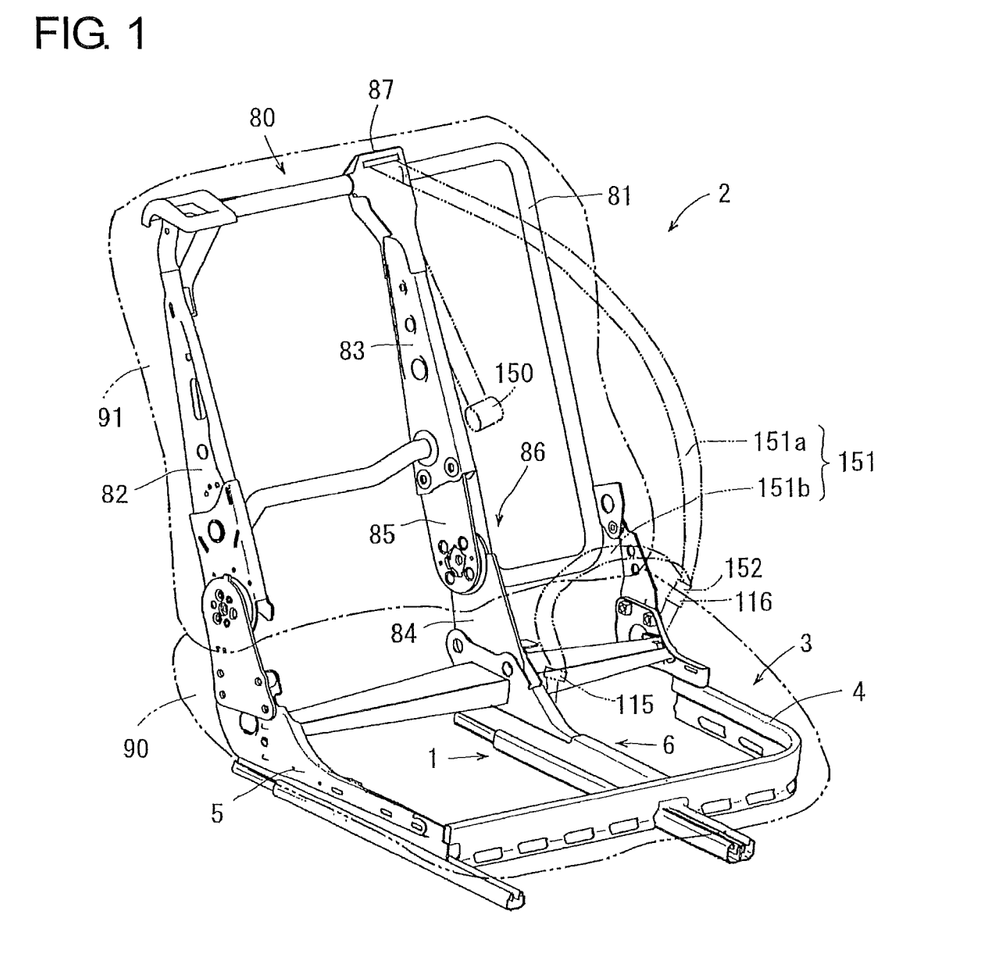
[FIG. 1] is a perspective view of a vehicle seat device incorporating a vehicle seat slide device in an embodiment.

Hereafter, with reference to the drawings, description will be made regarding an embodiment in which a vehicle seat slide device according to the present invention is practiced in a vehicle seat device. As shown in FIG. 1, in the vehicle seat device, a vehicle seat frame 2 is assembled to the vehicle seat slide device 1. The vehicle seat frame 2 is provided with a seat cushion frame 3 supporting a seat cushion 90, a seatback frame 80 supporting a seatback 91, a recliner 86 pivotably joining the seatback 91 with the seat cushion 90 for adjusting the angle of pivot movement, and a shoulder belt anchor 87 provided on the upper end of the seatback frame 80. Back side frames 81, 82 are arranged on both sides of the seatback frame 80, and a back center frame 83 taking a hollow, square pillar shape is arranged at a center part of the seatback frame 80. Further, cushion side frames 4, 5 are arranged on both sides of the seat cushion frame 3, and a cushion center frame 6 is arranged at a center part of the seat cushion frame 3. An upper arm 85 made of a thick plate is fastened to a lower part of the back center frame 83 by means of bolts, and a lower arm 84 made of a thick plate is fastened to an upper part of the cushion center frame 6 by means of bolts. Then, the recliner 86 which pivotably joins the upper arm 85 and the lower arm 84 is provided between the upper arm 85 and the lower arm 84.

Further, a retractor 150 is attached to the seatback frame 80, and one end of a seat belt 151 composed of a shoulder belt portion 151a and a lap belt portion 151b is retractable by the retractor 150. The other end of the seat belt 151 is fixed to an anchor plate 115 attached to the cushion center frame 6, and an intermediate part of the seat belt 151 passes through a tongue plate 152. The tongue plate 152 is able to be attached to, or detached from, a buckle 116 attached to the cushion side frame 4. Herein, of the seat belt 151, a portion extending from the retractor 150 to the tongue plate 152 is called the "shoulder belt portion 151a", whereas a portion extending from the tongue plate 152 to the anchor plate 115 is called the "lap belt portion 151b".

Figure 2:
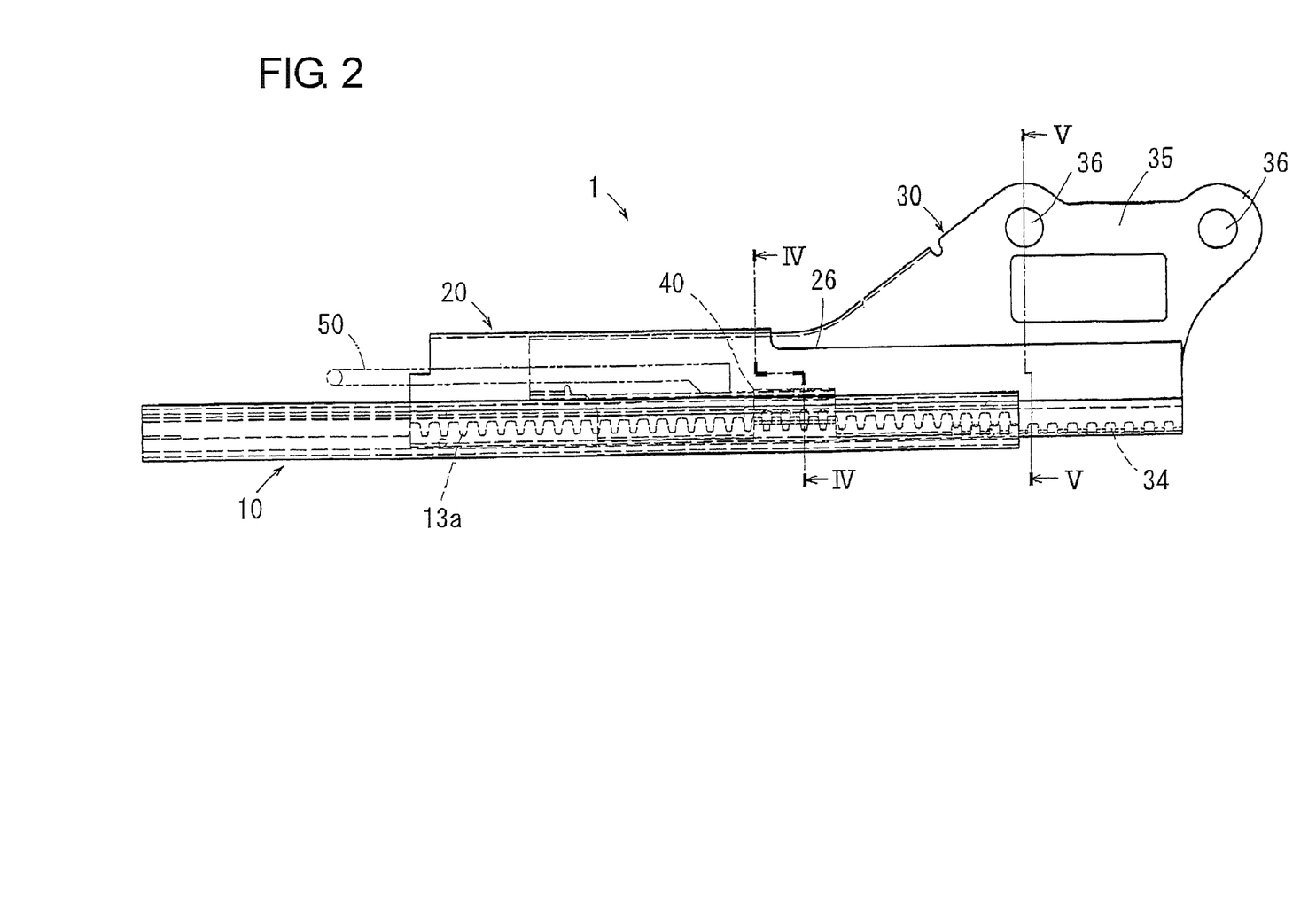
[FIG. 2] is a front view of the vehicle seat slide device in the embodiment.
Figure 3:
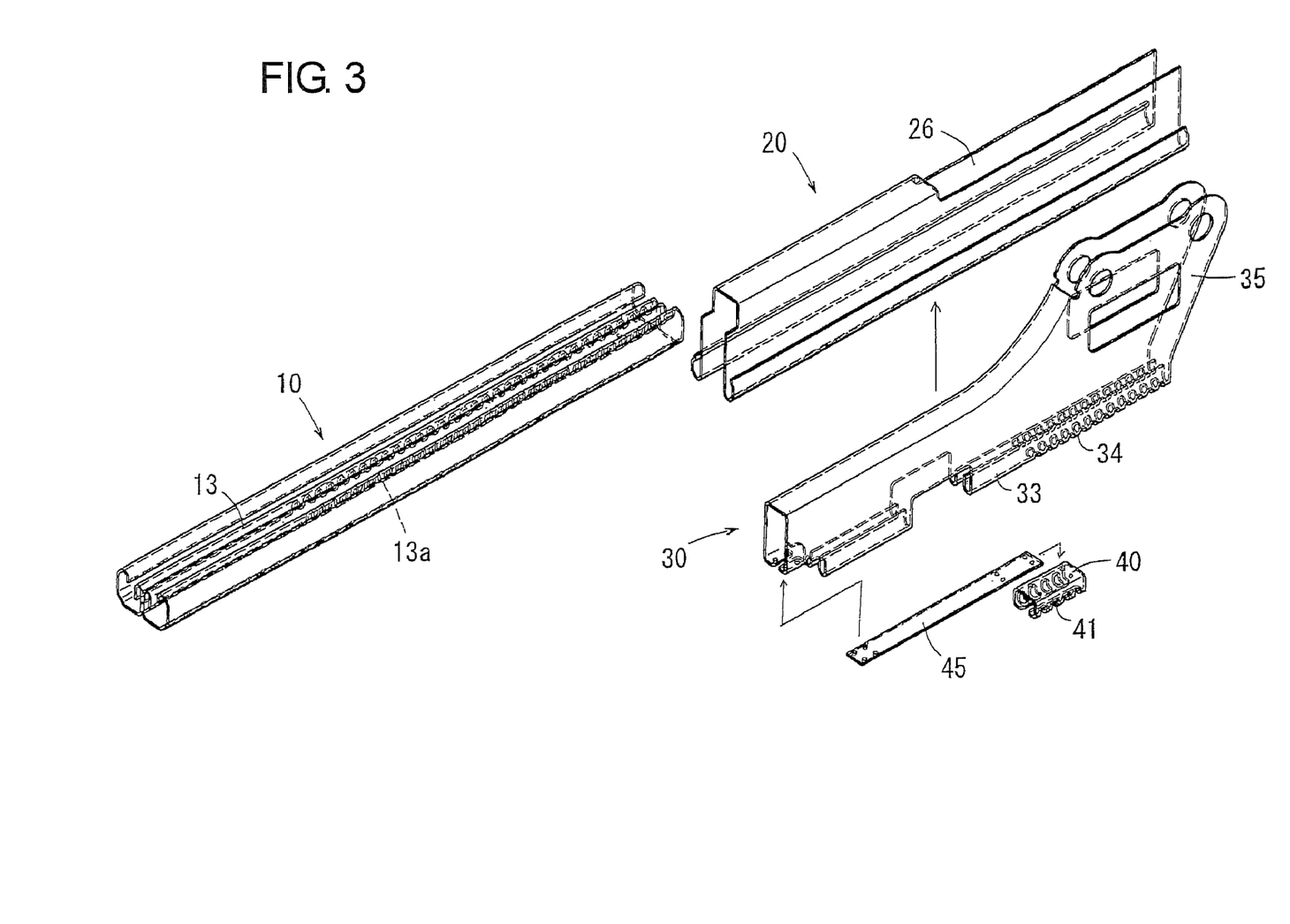
[FIG. 3] is a perspective view in a disassembled state of the vehicle seat slide device in the embodiment.

FIGS. 2 and 3 are a front view and a perspective view in a disassembled state of the vehicle seat slide device 1. The vehicle seat slide device 1 is provided with a lower rail 10 fixed to a vehicle floor, an upper rail 20 supported movably relative to the lower rail 10 and a hook member 30 provided in the upper rail 20. Pluralities of lock claws 13a in a comb-tooth shape are formed at lower hook portions 13 of the lower rail 10 in the longitudinal direction thereof, and in the hook member 30, a lock lever 40 provided with lock holes 41 which are disengageably engageable with the lock claws 13a is urged by a leaf spring 45 upward (refer to FIG. 4). As described later, the hook member 30 is joined to the upper rail 20 inside of the same. Thus, in a usual state, the lock claws 13a of the lower rail 10 are in engagements with the lock holes 41 of the lock lever 40, so that the lower rail 10 and the upper rail 20 remain locked. Then, when the seat cushion 90 and the seat back 91 are to be moved, a handle 50 arranged under the seat cushion 90 is drawn up. Thus, the lock lever 40 is pushed down against the leaf spring 45 to release the lock between the lower rail 10 and the upper rail 20, whereby the upper frame is made to be free to move in the forward-rearward direction. The lower hook portions 13 constitute a "hook mechanism" together with upper hook portions 33 referred to later.

Figure 4:
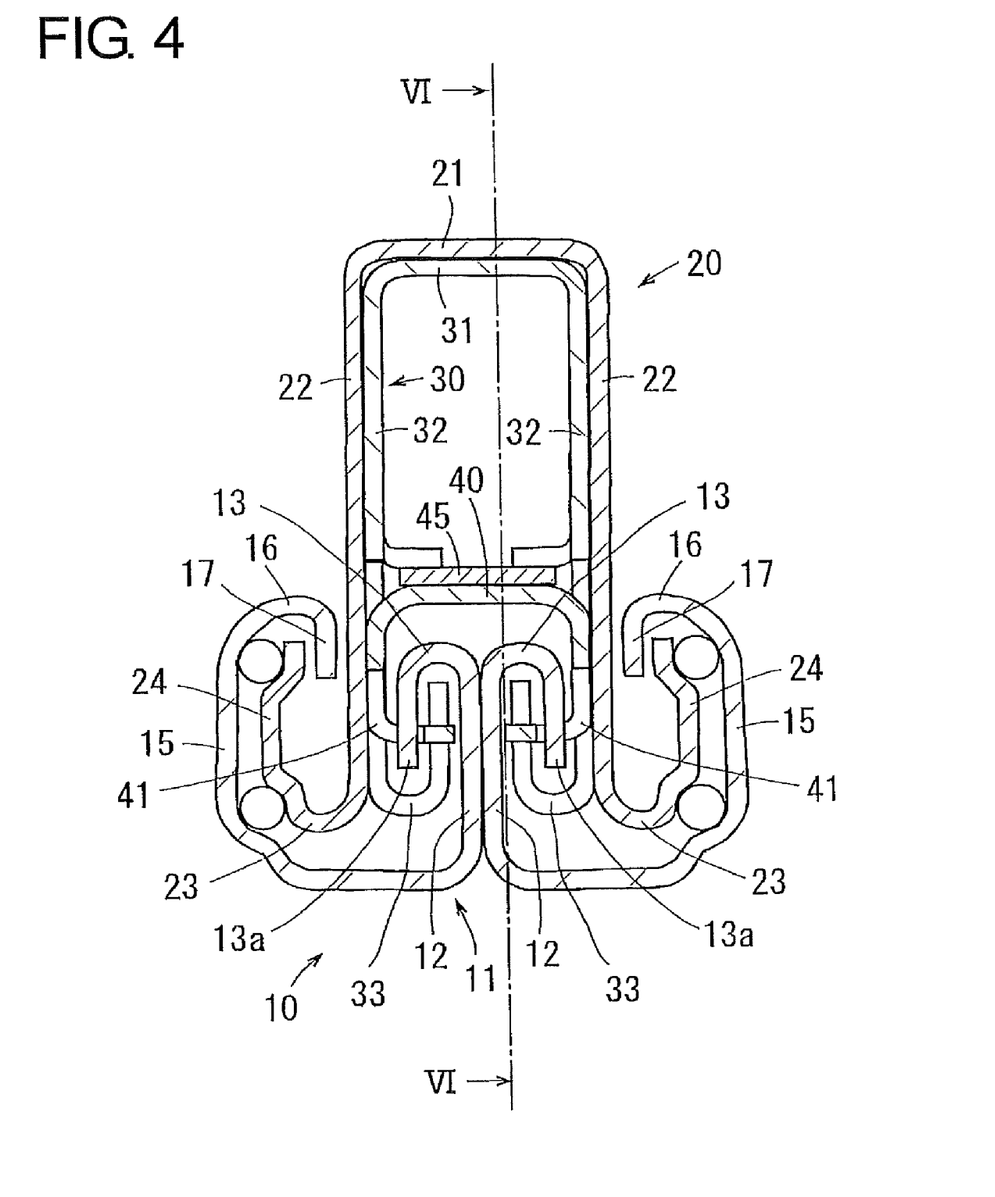
[FIG. 4] is a sectional view taken along the line IV-IV in FIG. 2 of the vehicle seat slide device in the embodiment.
Figure 6:
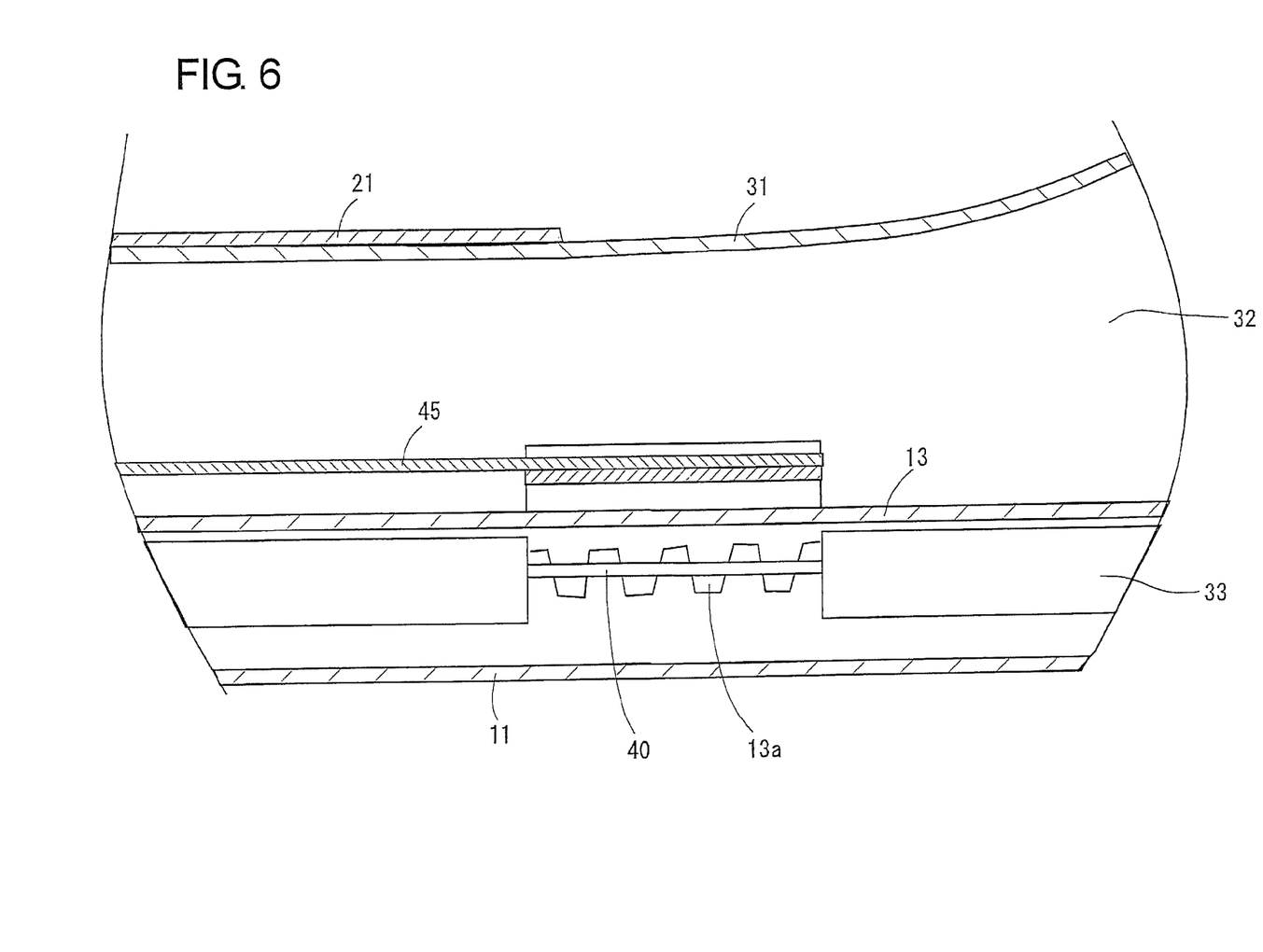
[FIG. 6] is a sectional view taken along the line VI-VI in FIG. 4 of the vehicle seat slide device in the embodiment.

As shown in FIGS. 4 and 6, the lower rail 10 has a base portion 11 extending in face-to-face relation with the vehicle floor, two first inside portions 12 which extend in close contact upward from a center part of the base portion 11, and the lower hook portions 13 which extend outwards from the upper ends of both of the first inside portions 12 each to take an inverted U-letter shape. The pluralities of lock claws 13a taking the comb-tooth shape are formed on end edge portions of the lower hook portions 13 in longitudinal direction. Further, the lower rail 10 has first outside portions 15 extending upward from both ends of the base portion 11, upper portions 16 extending inward from the upper ends of the both first outside portions 15, and second outside portions 17 extending downward from respective inner ends of the upper portions 16.

The upper rail 20 has a horizontal wall portion 21 parallel to the base portion 11, vertical wall portions 22 extending downward from both ends of the horizontal wall portion 21, connection portions 23 extending outward from lower ends of the vertical wall portions 22, and rising portions 24 extending upward from respective outside ends of the connection portions 23.

The hook member 30 has a horizontal portion 31 parallel to the base portion 11, joining portions 32 extending downward from both ends of the horizontal portion 31, and the upper hook portions 33 extending inward from lower ends of the joining portions 32 each to take a U-letter shape. Then, the hook member 30 is in contact at an upper surface of the horizontal portion 31 thereof with a lower surface of the horizontal wall portion 21 of the upper rail 20 and is welded at the joining portions 32 thereof to the inner faces of the both vertical wall portions 22 of the upper rail 20. Thus, the upper rail 20 and the hook member 30 are united, and when a separation load against the lower rail 10 (i.e., a load to separate the upper rail 20 from the lower rail 10) is exerted on the upper rail 20, the lower hook portions 13 and the upper hook portions 33 are brought into engagements. It is to be noted that FIGS. 4 and 6 show the state that as a result of the lock lever 40 being urged upward by the leaf spring 45, the lock claws 13a of the lower hook portions 13 are engaged with the lock holes 41 of the lock lever 40 to make the lower rail 10 and the upper rail 20 locked. The upper hook portions 33 constitute a "hook mechanism" together with the aforementioned lower hook portions 13.

Figure 5:
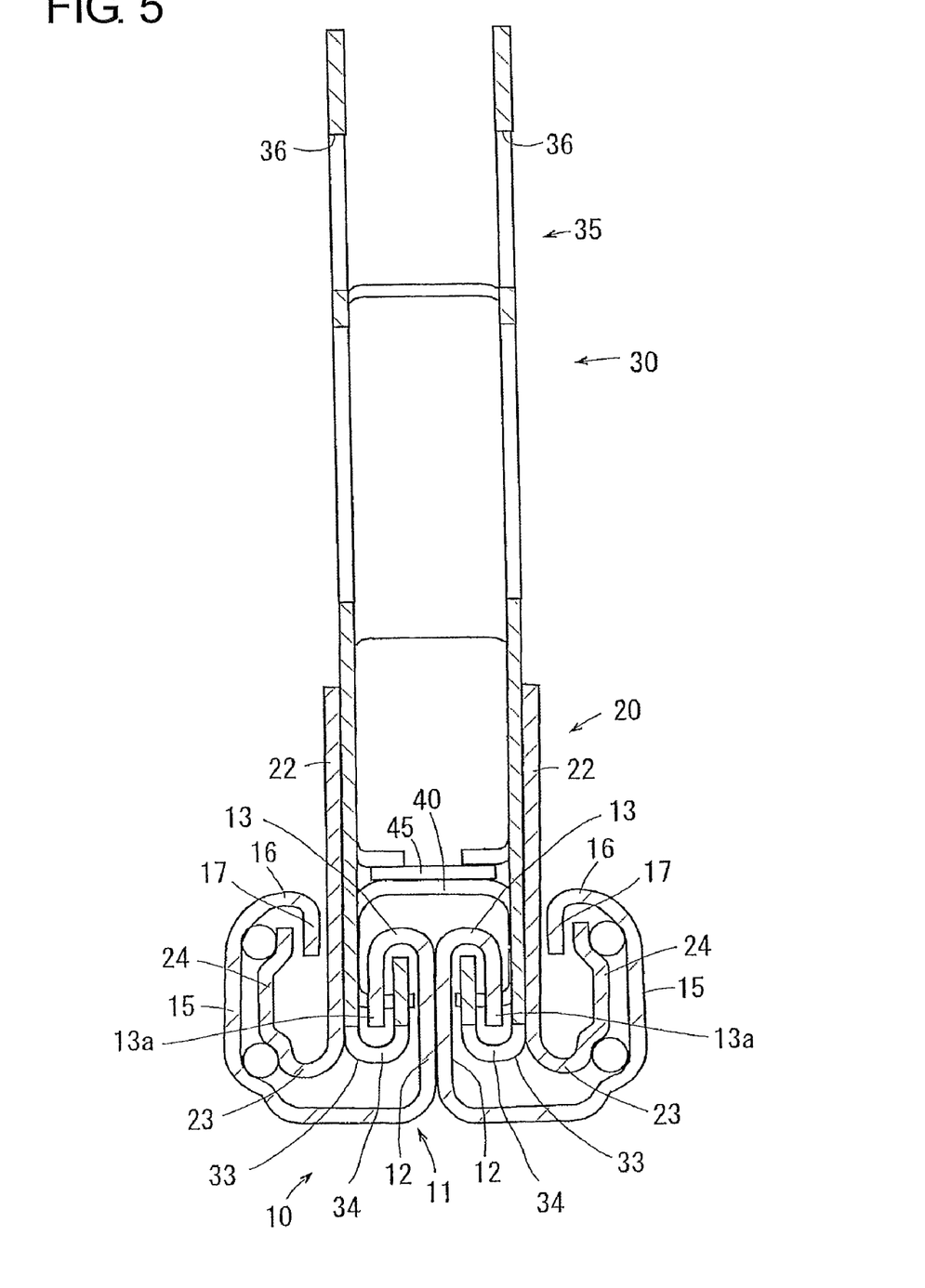
[FIG. 5] is a sectional view taken along the line V-V in FIG. 2 of the vehicle seat slide device in the embodiment.

As shown in FIGS. 2 and 3, an opening portion 26 opening rearward is formed at a rear part of the horizontal wall portion 21 of the upper rail 20. Further, a fastened portion 35 which extends outside from the opening portion 26 to be fastened to the back center frame 83 is formed on the hook member 30, and attaching holes 36 are provided at the fastened portion 35. The fastened portion 35 is bolt-fastened to the lower arm 84 through the attaching holes 36, whereby the hook member 30 is fastened to the back center frame 83 through the lower arm 84 and the like. In this construction, the upper rail 20 and the hook member 30 constitute the cushion center frame 6. Further, as also shown in FIG. 5, pluralities of bottom holes 34 are formed at the upper hook portions 33 of the hook member 30. Therefore, when the upper rail 20 is deformed relative to the lower rail 10 by having a separation load exerted thereon, the lock claws 13a and the bottom holes 34 are brought into engagements.

In the vehicle seat slide device 1 according to the embodiment, the lower rail 10 has the base portion 11 extending in face-to-face relation with the vehicle floor, the two first inside portions 12 extending in close contact upward from the center part of the base portion 11, and the lower hook portions 13 extending outward from the upper ends of the both first inside portions 12 each to take the inverted U-letter shape, whereas the upper rail 20 has the horizontal wall portion 21 parallel to the base portion 11 and the vertical wall portions 22 extending downward from both ends of the horizontal wall portion 21. Further, the upper rail 20 is provided therein with the hook member 30 which has the joining portions 32 joined with the both vertical wall portions 22 and extending downward and the upper hook portions 33 extending inward from the lower ends of the joining portions 32 each to take the U-letter shape. Then, when a separation load against the lower rail 10 is exerted on the upper rail 20, the lower hook portions 13 and the upper hook portions 33 are brought into engagements. Therefore, where the separation load acts on the upper rail 20 against the lower rail 10 at the time of a vehicle collision (particularly, at the time of a frontal collision), the load which vertically acts on the upper rail 20 is vertically transmitted to the hook member 30 and is efficiently transmitted as it is to the upper hook portions 33 and the lower hook portions 13, so that the separation of the upper rail 20 can be prevented with the strength secured. Further, since the upper hook portions 33 and the lower hook portions 13 are housed in the lower rail 10 and the upper rail 20, it can be avoided to become large in dimension. Further, since a bending moment exerted on the upper hook portions 33 and the lower hook portions 13 is not so great, it is not required to extremely thicken the upper hook portions 33 and the lower hook portions 13. Accordingly, the vehicle seat slide device 1 can be downsized and light weight and can be secured in strength.

Further, in this vehicle seat slide device 1, the horizontal portion 31 of the hook member 30 is held in contact with the horizontal wall portion 21 of the upper rail 20, the opening portion 26 opening rearward is formed at the rear part of the horizontal wall portion 21 of the upper rail 20, and the hook member 30 is provided with the fastened portion 35 which is fastened to the back center frame 83 through the lower arm 84 and the like. Then, because the fastened portion 35 of the hook member 30 is extended outside from the opening portion 26 of the horizontal wall portion 21, the lower surface of the horizontal wall portion 21 of the upper rail 20 and the horizontal portion 31 of the hook member 30 are deformed to come into close contact when an upward load is exerted on the back center frame 83 at the time of a vehicle collision (particularly, at the time of a frontal collision), and the hook member 30 and the upper rail 20 can be prevented from being separated, so that a further increased strength can be secured.

Further, in the vehicle seat slide device 1, since the upper rail 20 and the hook member 30 constitute the cushion center frame 6, the number of the parts can be reduced.

Further, in the vehicle seat slide device 1, since the pluralities of lock claws 13a of a comb-tooth shape are formed on the lower hook portions 13 of the lower rail 10 in the longitudinal direction and since the lock lever 40 with the lock holes 41 formed to be disengageably engageable with the lock claws 13a is provided to be vertically movable in the hook member 30 joined with the upper rail 20, it is possible to lock and move the upper rail 20 relative to the lower rail 10.

Further, in the vehicle seat slide device 1, the pluralities of bottom holes 34 are formed at the upper hook portions 33 of the hook member 30 joined with the upper rail 20, and since the lock claws 13a and the bottom holes 34 are brought into engagements when the upper rail 20 is deformed relative to the lower rail 10 by an separation load being exerted thereon, it is possible to decrease the deformation of the upper rail 20 relative to the lower rail 10.

The vehicle seat device in which the shoulder belt anchor 87 is provided on the upper end of the back center frame 83 is employed in the present embodiment. However, without being limited to such vehicle seat device, the seat slide device 1 may be used in a vehicle seat device in which the shoulder belt anchor is provided at the vehicle body.

Although the vehicle seat slide device 1 of the present invention has been described based on the embodiment as described hereinabove, it is needless to say that the present invention is not limited to these and may be applicable in suitably modified forms without departing from the technological concept of the present invention.

INDUSTRIAL APPLICABILITY

A vehicle seat slide device according to the present invention is suitable for use as a vehicle seat slide device which is provided with a lower rail fixed to a vehicle floor, an upper rail support movably relative to the lower rail and a hook mechanism for absorbing a separation load acting on the upper rail against the lower rail.

The invention claimed is:

1. A vehicle seat slide device comprising:
   a lower rail adapted to be fixed to a vehicle floor and having a base portion to extend in face-to-face relation with the floor when the lower rail is fixed to the vehicle floor, two first inside portions extending in close contact upward from a center part of the base portion, and lower hook portions extending outward from upper ends of both of the first inside portions each to take an inverted U-letter shape, and first outside portions extending upward from both ends of the base portion;
   an upper rail supported movably relative to the lower rail and having a horizontal wall portion arranged over the lower hook portions and parallel to the base portion and vertical wall portions extending downward from both ends of the horizontal wall portion, connection portions extending outward from lower ends of the vertical wall portions, and rising portions extending upward from respective outside ends of the connection portions and respectively facing the first outside portions; and
   a hook member having joining portions provided in the upper rail to be joined with both of the vertical walls and to extend downward and upper hook portions provided in the upper rail to extend inward from lower ends of the joining portions and each to take a U-letter shape;
   wherein when a separation load against the lower rail is exerted on the upper rail, the lower hook portions and the upper hook portions are brought into engagements to absorb the separation load acting on the upper rail against the lower rail.

2. The vehicle seat slide device in claim 1, wherein:
   a horizontal portion connecting upper ends of the both joining portions of the hook member is in contact with a lower surface of the horizontal wall portion of the upper rail;
   an opening portion opening rearward is formed at a rear part of the horizontal wall portion of the upper rail;
   the hook member is provided with a fastened portion to be fastened to a seatback frame; and
   the fastened portion of the hook member extends outside from the opening portion of the horizontal wall portion.

3. The vehicle seat slide device in claim 1, wherein:
   the upper rail and the hook member constitute a seat cushion frame.

4. The vehicle seat slide device in claim 1, wherein the lower hook portions of the lower rail are provided with pluralities of lock claws of a comb-tooth shape in a longitudinal direction; and further comprising:
  a lock lever provided thereon with lock holes to be disengageably engageable with the lock claws and being vertically movably provided in the upper rail.

5. The vehicle seat slide device in claim 4, wherein:
the upper hook portions of the hook member are provided with pluralities of bottom holes; and
when the upper rail with a separation load exerted thereon is deformed relative to the lower rail, the lock claws are brought into engagements with the bottom holes.

6. The vehicle seat slide device in claim 1, wherein the lower rail further has upper portions extending inward from upper ends of the first outside portion.

7. The vehicle seat slide device in claim 6, wherein the lower rail further has second outside portions extending downward from respective inner ends of the upper portions.

8. The vehicle seat slide device in claim 7, further comprising sliding members provided between the rising portions and the upper portions in contact with the rising portions and the upper portions and enabling the upper rail to be slidable relative to the lower rail.

9. The vehicle seat slide device in claim 1, wherein the first outside portions are provided at both end portions of the base portion in a direction perpendicular to a moving direction of the upper rail relative to the lower rail.

10. A vehicle seat slide device comprising:
  a lower rail adapted to be fixed to a vehicle floor and having a base portion to extend in face-to-face relation with the floor when the lower rail is fixed to the vehicle floor, two first inside portions extending in close contact upward from a center part of the base portion, and lower hook portions extending outward from upper ends of both of the first inside portions each to take an inverted U-letter shape;
  an upper rail supported movably relative to the lower rail and having a horizontal wall portion parallel to the base portion and vertical wall portions extending downward from both ends of the horizontal wall portion;
  a hook member having joining portions provided in the upper rail to be joined with both of the vertical walls and to extend downward and upper hook portions provided in the upper rail to extend inward from lower ends of the joining portions and each to take a U-letter shape;
  wherein when a separation load against the lower rail is exerted on the upper rail, the lower hook portions and the upper hook portions are brought into engagements to absorb the separation load acting on the upper rail against the lower rail;
  a horizontal portion connecting upper ends of the both joining portions of the hook member is in contact with a lower surface of the horizontal wall portion of the upper rail;
  an opening portion opening rearward is formed at a rear part of the horizontal wall portion of the upper rail;
  the hook member is provided with a fastened portion to be fastened to a seatback frame; and
  the fastened portion of the hook member extends outside from the opening portion of the horizontal wall portion.

11. A vehicle seat slide device comprising:
  a lower rail adapted to be fixed to a vehicle floor and having a base portion to extend in face-to-face relation with the floor when the lower rail is fixed to the vehicle floor, two first inside portions extending in close contact upward from a center part of the base portion, and lower hook portions extending outward from upper ends of both of the first inside portions each to take an inverted U-letter shape;
  an upper rail supported movably relative to the lower rail and having a horizontal wall portion parallel to the base portion and vertical wall portions extending downward from both ends of the horizontal wall portion;
  a hook member having joining portions provided in the upper rail to be joined with both of the vertical walls and to extend downward and upper hook portions provided in the upper rail to extend inward from lower ends of the joining portions and each to take a U-letter shape;
  wherein when a separation load against the lower rail is exerted on the upper rail, the lower hook portions and the upper hook portions are brought into engagements to absorb the separation load acting on the upper rail against the lower rail;
  wherein the lower hook portions of the lower rail are provided with pluralities of lock claws of a comb-tooth shape in a longitudinal direction; and further comprising:
  a lock lever provided thereon with lock holes to be disengageably engageable with the lock claws and being vertically movably provided in the upper rail.

* * * * *